United States Patent [19]

Jarger et al.

[11] 4,295,155
[45] Oct. 13, 1981

[54] GRAY SCALE SYNC VIDEO PROCESSING SYSTEM

[75] Inventors: Harold F. Jarger, Rochelle Park; Marvin L. Sassler, Wayne, both of N.J.

[73] Assignee: International Telephone and Telegraph Corporation, New York, N.Y.

[21] Appl. No.: 47,188

[22] Filed: Jun. 8, 1979

[51] Int. Cl.³ .............................................. H04J 9/32
[52] U.S. Cl. ........................................ 358/12; 358/17; 358/142; 358/120; 358/160
[58] Field of Search ............... 358/142, 145, 148, 151, 358/153, 160, 165, 186, 114, 120, 17, 21, 12, 19

[56] References Cited

U.S. PATENT DOCUMENTS

| | | |
|---|---|---|
| 2,114,688 | 4/1938 | Schriever ............................ 358/186 |
| 2,204,427 | 6/1940 | Moller ................................. 358/151 |
| 2,907,816 | 10/1959 | Weiss . |
| 3,335,218 | 8/1967 | Johnson . |
| 3,439,113 | 4/1969 | Walker . |
| 3,440,338 | 4/1969 | Walker . |
| 3,478,166 | 11/1969 | Reiter et al. . |
| 3,504,115 | 3/1970 | Suzuki et al. ....................... 358/142 |
| 3,527,877 | 9/1970 | Walker . |
| 3,723,637 | 3/1973 | Fujio . |
| 3,924,059 | 12/1975 | Horowitz . |
| 4,075,660 | 2/1978 | Horowitz . |

*Primary Examiner*—Richard Murray
*Attorney, Agent, or Firm*—John T. O'Halloran; Thomas N. Twomey

[57] ABSTRACT

The blacker-than-black sync pulse of a standard video signal is replaced by a gray scale sync to increase picture signal, permit audio multiplexing and allow security phase inversion by means of encoder and decoder circuitry including a sync stripper, gate and timing generator, audio processor, phase code generator, color reference regenerator, blank and summing amplifier, and phase reversal amplifier.

39 Claims, 10 Drawing Figures

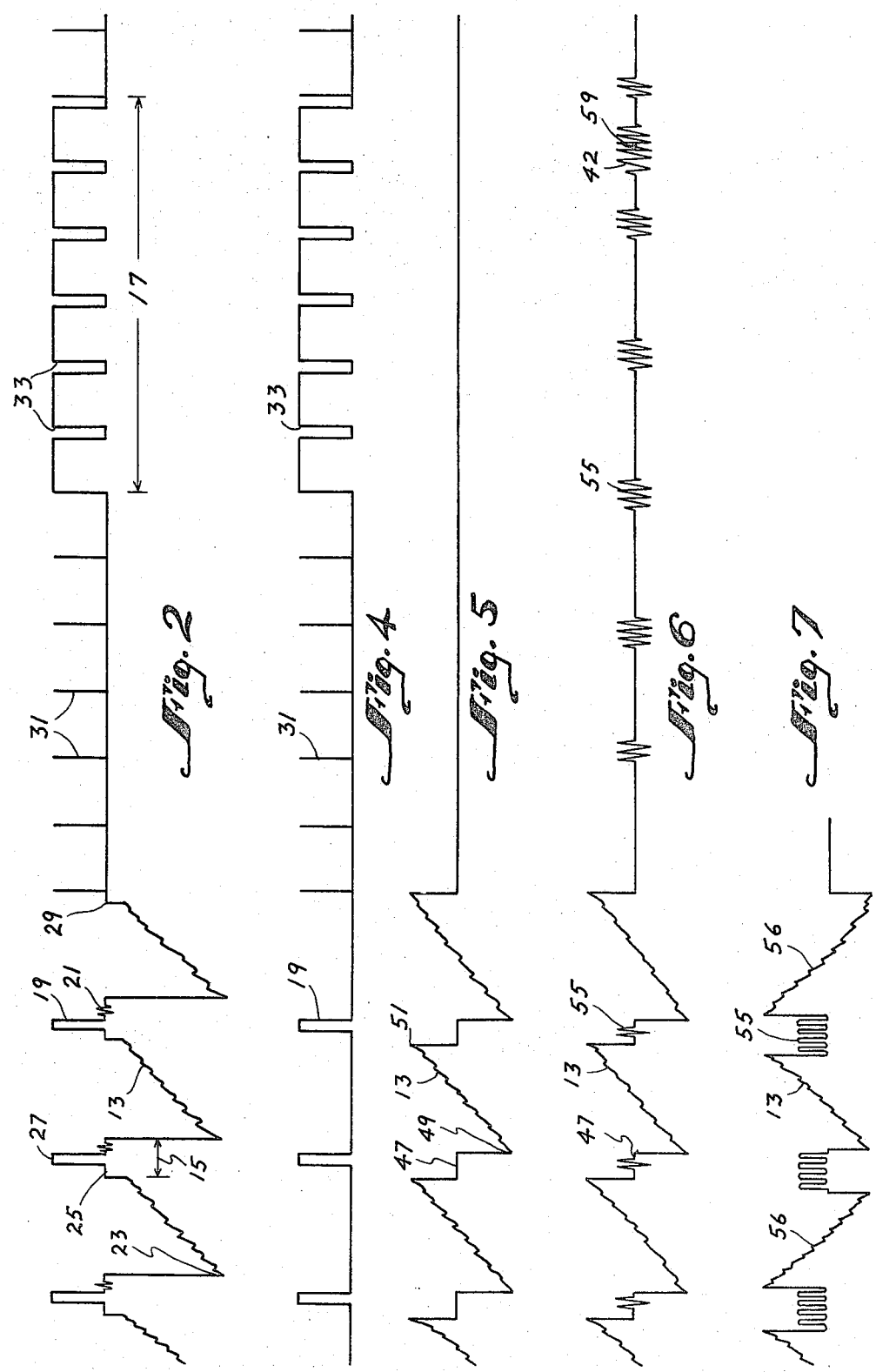

GRAY SCALE SYNC VIDEO PROCESSING SYSTEM

BACKGROUND OF THE INVENTION

1. Field of the Invention

This invention relates to a gray scale sync video format that uses the frequency spectrum in FM systems more effectively by replacing the NTSC (National Television System Committee) blacker-than-black sync pulse (which accounts for about 30 percent of the composite signal peak-to-peak deviation) with gray scale sync that permits the picture signal to be increased by an amount equivalent to the 30 percent.

2. Description of the Prior Art

The past several years have witnessed a major increase in utilization of domestic satellites for video distribution systems. This trend is expected to continue at an accelerated pace. In its wake is a strong demand for smaller, lower cost TVRO (Receive Only) stations which are capable of providing NTC-7 (specifications of the Network Transmission Committee of the Video Transmission Engineering Advisory Committee of the Joint Committee of Television Network Broadcasters and the Bell System picture quality performance).

To the best of applicants' knowledge, no one has devised a video gray scale sync processing system whereby the standard video sync pulse and color burst is deleted and subsequently regenerated, no one has ever replaced the color burst and sync signals with pulses containing color reference, audio and horizontal sync information, no one has achieved a 3 dB improvement in picture signal-to-noise ratio (relative to NTSC format), and no one has used the technique of flipping the video scan lines to provide security and symmetrical video spectrum distribution in FM systems.

With respect to the unique audio multiplexing concept of this invention, one current method of transmitting the audio requires a separate carrier which is most wasteful of the satellite spectrum.

A second technique is to introduce the sound at the upper portion of the video bandwidth, resulting in picture information degradation. This requires a low-pass filter which cuts off at 5 mHz. The audio modulates a subcarrier such as 6.2 mHz above the picture information. The disadvantage of this technique of adding audio subcarriers is getting picture information into sound and sound into picture. Also because there is a wider bandwidth, one may get more noise.

SUMMARY OF THE INVENTION

The heart of this invention is to optimize video signals to obtain improved reception, especially for satellite communication where transponder power and bandwidth are limited and costly.

This is uniquely achieved through a number of techniques, including (a) replacement of the conventional NTSC (standard video format) blacker-than-black sync pulse and color burst of the horizontal blanking interval with gray scale synchronization within the white-to-black region which permits greater picture frequency deviation for a given RF bandwidth, (b) reversing the polarity of alternate video lines to obtain spectrum symmetry around the RF carrier frequency to optimize bandwidth utilization and improved operation of threshold extension receivers and also transmission security and (c) incorporating audio channels through pulse-width modulation within the horizontal blanking interval which require no additional video or RF bandwidth.

The enhancement of the picture signal component results in an improvement in picture signal-to-noise ratio of approximately 3 dB (relative to NTSC format). This can be used to obtain equivalent performance with 3 dB lower earth station G/T (ratio of antenna receive gain to receive system noise temperature), i.e., with smaller antenna or higher noise temperature receiver.

Symmetrical distribution of the FM spectrum is accomplished by switching the polarity of alternate video scan lines. Such symmetry is desirable for use with threshold extension receivers which can further reduce the earth station G/T requirement by reducing the C/N (the ratio of receive carrier power to receive system noise power) operating point for a particular operating margin.

Secure video transmission is also provided by switching the polarity of alternate video scan lines, which gives a first order security capability. Higher levels of security may be obtained by driving the line switching gates from a coded source, such as a pseudo-random generator.

This invention is capable of audio multiplexing up to at least six 5 kHz voice channels or two 15 kHz program channels, or combinations, onto the video baseband signal using pulsewidth modulation during the horizontal blanking interval. This feature permits a mix of order-wire, program, cue and data channels to be transmitted as part of the video signal with negligible increase in video bandwidth, without adding video subcarriers or separate audio-dedicated satellite carriers.

Thus, it is a primary object of this invention to significantly increase the video signal-to-noise ratio.

A related object is to permit the use of a smaller antenna for given performance.

Another related object is to permit decreased bandwidth for the same quality picture that could only be conventionally obtained with a greater bandwidth.

An additional object of this invention is optimizing spectrum distribution which is particularly suited for threshold extension receivers.

A further object of this invention is the provision of secure video/audio transmission.

Still another object of this invention is the elimination of the need for separate RF or video subcarriers.

The above mentioned and other features and objectives of this invention will become more apparent by reference to the following description taken in conjunction with the accompanying drawings.

BRIEF DESCRIPTION OF THE DRAWINGS

FIG. 2 illustrates a standard video signal waveform.

FIG. 4 is an illustration of the video signal waveform after the sync is stripped.

FIG. 5 illustrates the blanked video waveform.

FIG. 6 illustrates the video waveform with the gray scale synchronization and field index burst signal.

FIG. 7 illustrates the phase inverted video/audio signal at the encoder output.

DESCRIPTION OF THE PREFERRED EMBODIMENT

Figure 1:
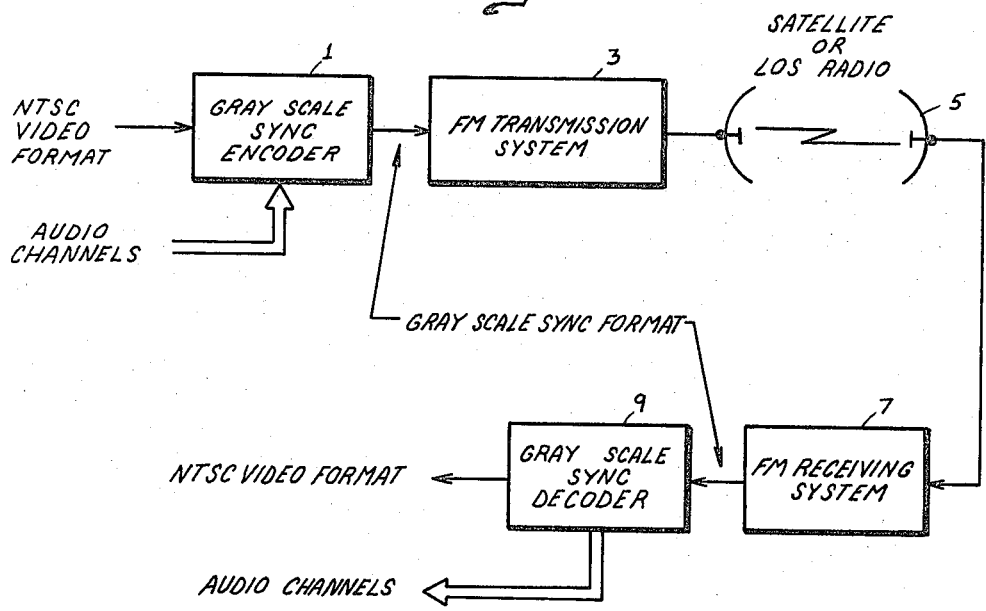
FIG. 1 is a diagram illustrating the application of the gray scale sync video processing system to a generalized video transmission scheme.

Referring to FIG. 1, this simple diagram illustrates the mixing of the video and audio signals in encoder 1, feeding the resultant gray scale sync composite signal to FM transmission system 3, signal transmission via satellite 5 to receiver 7, and conversion of the gray scale sync composite signal to the standard video format and audio channels by means of decoder 9. The satellite or LOS (Line of Sight) segment of the system carries video information in the gray scale sync format. Both the source and received signals are NTSC video formats. Other TV formats from abroad such as PAL (Phase Alternation Line) and SECAM (Sequential With Memory) may also be accommodated.

FIG. 2 illustrates the NTSC video format at the input of encoder 1. This standard video signal includes video components 13 interspersed with horizontal blanking intervals 15 and vertical blanking intervals 17.

Each of the horizontal blanking intervals contains horizontal sync pulse 19 and color burst 21 which may be, for instance, at approximately 3.58 mHz. The video picture goes from white at point 23 to black at level 25 to blacker-than-black at tip 27 of sync pulse 19.

The vertical blanking portion of the video signal starts at point 29 and includes narrow equalizing pulses 31 that continue the horizontal sync at double the horizontal rate due to the interlace problem of odd and even fields. Within vertical interval 17 of the odd numbered field shown are serrated vertical sync pulses 33.

Figure 3:
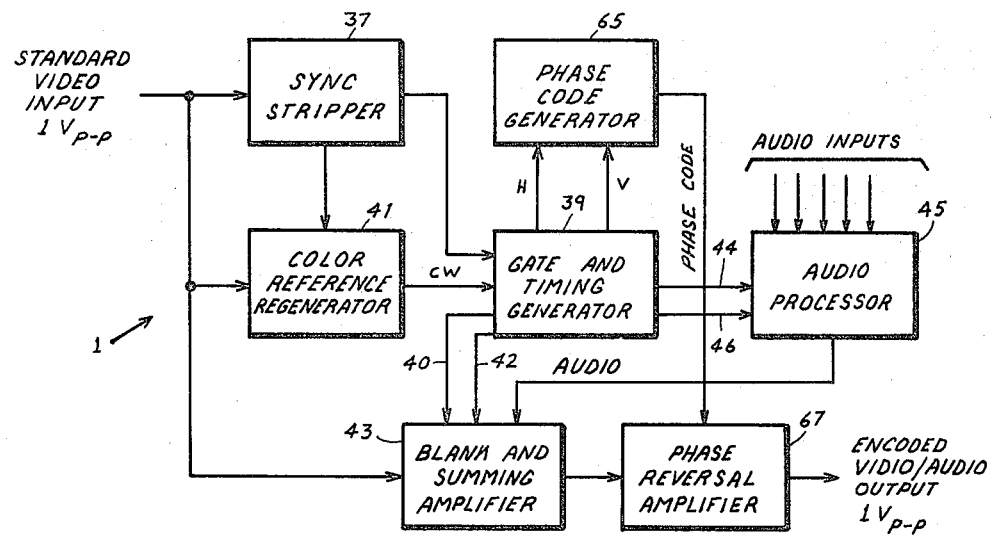
FIG. 3 is a block diagram of the gray scale sync encoder.

The 1 volt peak-to-peak video signal of FIG. 2 is introduced to sync stripper 37 of FIG. 3. After the stripping process, pulses 19, 31 and 33 of the output signal shown in FIG. 4 are routed to gate and timing generator 39 and to color reference regenerator 41. Color reference regenerator 41 generates a CW (Continuous Wave) signal at the color reference signal frequency.

Generator 39 gives a composite blanking signal 40 and field index burst signal 42 to blank and summing amplifier 43 and supplies signals 44 and 46 to audio processor 45 for color reference phase and horizontal gating respectively. Color burst signals 46 are sent through only during horizontal blank periods to minimize cross-coupling of frequency.

FIG. 5 illustrates the waveform in amplifier 43 with the absence of sync pulses 19 and burst 21 upon summing the video input and composite blanking signal 40. Level 47 of horizontal blanking interval 15 is now midway between white point 49 and black point 51.

Figure 9:
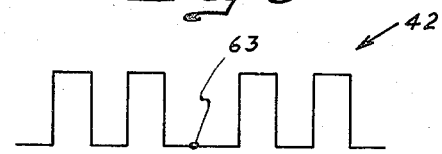
FIG. 9 is a detailed view of the waveform of FIG. 6 at the point of phase reversal.

Referring back to FIG. 3, the audio pulses are sent to amplifier 43 from processor 45. Burst signal 42 and audio combines with the waveform of FIG. 5 to produce the amplifier 43 output signal illustrated in FIG. 6. The synchronization 55 of FIG. 6 is now in the gray scale, midway between white and black. Field index burst signal 42 contains a 180° phase reversal at point 59, which provides an accurate synchronizing signal. FIG. 9 shows a detailed view of field index burst signal 42 at point 63 of phase reversal.

The phase code generator 65 of FIG. 3 causes the phase reversal amplifier 67 to generate the encoded signal of FIG. 7, illustrating video components 56 in phase inversion with components 13.

Figure 8:
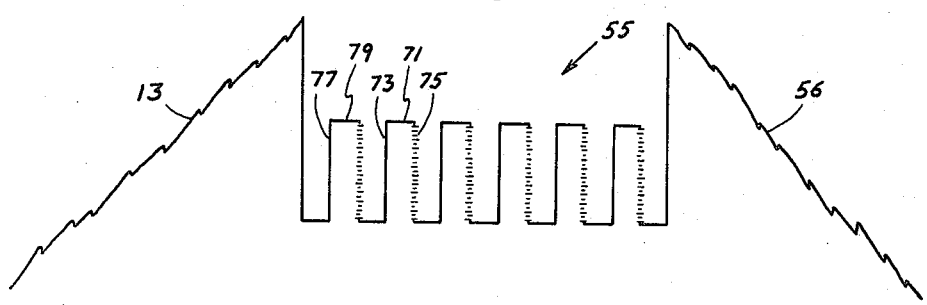
FIG. 8 is a blown up view of the encoded audio pulses illustrated in FIG. 7.

FIG. 8 illustrates gray scale sync pulses 71 within synchronization 55 of FIG. 7, replacing the conventional horizontal blanking interval 15, sync 19, and color burst 21. The leading edge 73 of pulses 71 is in phase with color burst signals 46. The trailing edge 75 of pulses 71 moves according to the audio information that has been pulse-width modulated onto pulses 71. The leading edge 77 of the first pulse 79 is fixed in phase with horizontal sync pulse 27. The difficulty of extracting the pulse-width modulated audio information from pulses 71 provides a high degree of security in transmission. Furthermore, the audio information is securely carried with no appreciable amount of bandwidth. Edge 73 contains the color burst information.

Referring to both FIGS. 7 and 8, it should be noted that during phase inversion, white is white with video components 13, but white becomes black with video components 56 because components 56 are 180° out of phase with components 13. This provides a high degree of security in transmission because any picture received by unauthorized persons would be garbled. Furthermore, each of lines 13 can be phase inverted with any predetermined pattern and reset at the beginning of each odd field. Security is assured unless someone has the means for uninverting the lines in order to obtain a usable picture. At the same time, the alternate flipping or phase inversion facilitates the desired symmetrical spectrum.

Figure 10:
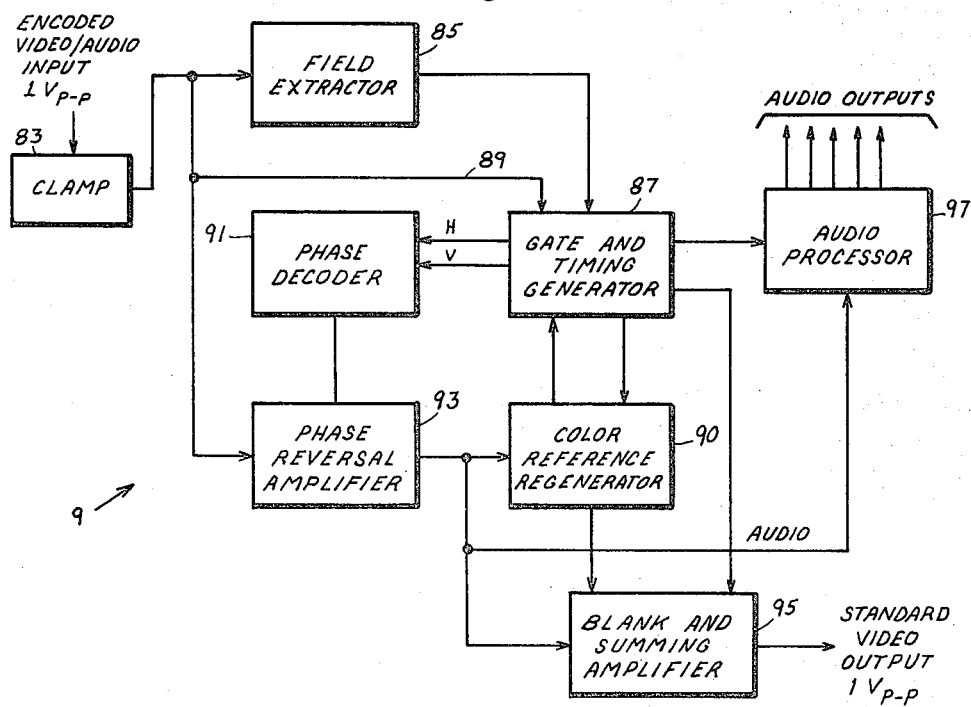
FIG. 10 is a block diagram of the gray scale sync decoder.

In FIG. 10, the encoded input signal goes into a clamp circuit 83. Clamp 83 eliminates dispersal that clamps the signal to a normal zero center voltage. The signal is split into two different paths. The signal entering field extractor 85 is phase reversed and goes into gate and timing generator 87. Generator 87 utilizes the output of field extractor 85 and clamped video 89 to regenerate a reference color signal together with color reference regenerator 90 and, on the basis of that signal, generates a composite video blank sync and color burst gate.

Generator 87 also provides horizontal and vertical information to phase decoder 91 which in turn is fed to phase reversal amplifier 93 which corrects the video phase. Phase decoder 91 controls and establishes the timing for phase reversal amplifier 93. The phase corrected video then goes to blank and summing amplifier 95. Flipping is eliminated at that point. Blank, syncs 19 and color bursts 21 are reinserted to output as the standard video signal. Phase reversal amplifier 93 also feeds audio processor 97 where the audio information is extracted.

While we have described above the principles of our invention in connection with specific apparatus, it is to be clearly understood that this description is made only by way of example and not as a limitation to the scope of our invention as set forth in the objects thereof and in the accompanying claims. For instance, this invention obviates the necessity for the user to buy a video processing amplifier because the user is already given a cleaned up signal. Although deleted, sync pulses 19 are regenerated in decoder 9 where noise is eliminated and rise time is improved.

What is claimed is:

1. A video processing system, comprising:
   a source of video signals of a given narrow bandwidth;
   means to transmit said video signals;

means to receive said video signals;
said video signals including a picture component and a blanking component;
first circuitry connected to said source and said transmission means for eliminating said blanking component and increasing said picture component for transmission; and wherein said picture component is increased by at least twenty-five percent of the composite peak-to-peak deviation of said signals;
a source of audio signals and wherein said first circuitry mixes said audio signals into said video signals; and
second circuitry connected to said receive means.

2. The system of claim 1, wherein said first circuitry increases the picture signal-to-noise ratio by 2.8 dB.

3. The system of claim 1, wherein said bandwidth remains constant.

4. The system of claim 3, wherein said bandwidth is decreased and the quality of said video signals remains constant.

5. The system of claim 1, wherein said first circuitry includes blanking means replacing said blanking component with synchronization means.

6. The system of claim 5, wherein said synchronization means is between the white and black extremities of said video signals.

7. The system of claim 5, wherein said synchronization means includes a plurality of pulses.

8. The system of claim 7, wherein said first circuitry includes phase reversal means and adjacent ones of said pulses may be phase inverted with respect to each other.

9. The system of claim 7, wherein said first circuitry includes color reference means and each of said pulses includes color reference information.

10. The system of claim 9, wherein said color information is at one edge of said pulses.

11. The system of claim 7, including a source of audio signals and wherein said first circuitry includes audio processing means and each of said pulses includes information from said audio signals.

12. The system of claim 11, wherein said information is pulse-width modulated onto one edge of said pulses and said bandwidth remains constant.

13. The system of claim 7, wherein said blanking component includes a horizontal sync and one edge of the first of said pulses is used for horizontal synchronization.

14. The system of claim 1, wherein said first circuitry includes phase reversal means and the polarity of alternate ones of said picture components is reversed.

15. The system of claim 14, wherein said polarity reversal produces a symmetrical spectrum around the RF carrier frequency of said video signals.

16. The system of claim 1, wherein said blanking component is regenerated in said second circuitry.

17. The method of processing a video signal with a picture component and a blanking component including the steps of:
eliminating the blanking component;
increasing the picture component simultaneously with said elimination step;
inserting synchronization in the video signal after the elimination step;
multiplexing audio information onto the video signal simultaneously with said synchronization step;
transmitting the resulting video signal.

18. The method of claim 17, including the step of inserting color information into the synchronization.

19. The method of claim 17, wherein the synchronization is placed between the white and black extremities of the video signal.

20. The method of claim 17, including the step of reversing polarity of alternating picture components.

21. The method of claim 20, including the step of producing a symmetrical spectrum around the RF carrier frequency of the video signal simultaneously with said reversal step.

22. The method of claim 17, including the step of regenerating the blanking component after said receiving step.

23. Video processing apparatus comprising:
a source of video signals of a given bandwidth;
means to transmit said signals;
said video signals including a picture component and a blanking component;
blanking means replacing said blanking component with synchronization means including a plurality of pulses;
a source of audio signals and wherein said audio signals are mixed into said video signals and said bandwidth remains constant; and
increasing said picture component for transmission.

24. The apparatus of claim 23, wherein said synchronization means is midway between the white and black extremities of said video signals.

25. The apparatus of claim 23, further comprising phase reversal means whereby adjacent ones of said pulses may be phase inverted with respect to each other.

26. The apparatus of claim 23, wherein the leading edge of said pulses includes color information.

27. The apparatus of claim 23, wherein said audio signals that are pulse-width modulated onto the trailing edge of said pulses and said bandwidth remains constant.

28. The apparatus of claim 23, wherein said blanking component creates a horizontal sync and the leading edge of the first of said pulses is in phase with said horizontal sync.

29. The apparatus of claim 23, wherein said blanking means includes phase reversal means and the polarity of alternate ones of said picture components is reversed.

30. The method of processing a video signal with a picture component and a blanking component including the steps of:
eliminating the blanking component;
increasing the picture component simultaneously with said elimination step;
inserting synchronization in the video signal after the elimination step;
multiplexing audio information onto the video signal simultaneously with said synchronization step;
inserting color information into the synchronization;
placing the synchronization midway between the white and black extremities of the video signal;
reversing the polarity of alternating picture components; and
transmitting the resulting video signal.

31. Video processing apparatus, comprising means for receiving video signals with modulated audio information, first circuitry connected to said means for extracting said information, second circuitry connected to said means for inserting a blanking component and decreasing the picture component in said signals.

32. The apparatus of claim 31, including third circuitry for reversing the phase of said signals.

33. The apparatus of claim 31, including fourth circuitry for generating a reference color signal.

34. The apparatus of claim 31, wherein said blanking component includes a horizontal sync pulse and a color burst.

35. The method of processing a video signal with audio information, comprising the steps of extracting said information, inserting a blanking component in said signal, and simultaneously with said insertion decreasing the picture component in said signal.

36. The method of claim 35, including the step of correcting the video phase of said signal prior to said extraction.

37. The method of claim 35, including the step of generating a reference color signal prior to said insertion.

38. The method of claim 37, wherein said component includes a blank sync and color burst.

39. The method of processing a video signal having a limited bandwidth and having a picture component and a blanking component including the steps of:
  eliminating the blanking component,
  increasing the picture component to more fully utilize the limited bandwidth,
  inverting each alternate line of the video signal to provide a more uniform frequency distribution centered about the carrier hence providing better use of threshold extension and suitable for use with a narrow bandwidth while improving the security of the transmission,
  providing a horizontal blanking interval midway between the white and black extremities of the video signal,
  providing a pulse width modulated audio signal in the horizontal blanking interval,
  transmitting the resulting signal.

* * * * *